United States Patent [19]

Frost et al.

[11] Patent Number: 5,139,105
[45] Date of Patent: Aug. 18, 1992

[54] FOUR WHEEL STEERING VEHICLE WITH VALVE POSITION RETAINING MEANS

[75] Inventors: Roger A. Frost, Uttoxeter; Robert J. Andrew, Congleton; Simon J. Langford, Stoke-on-Trent, all of United Kingdom

[73] Assignee: J. C. Bamford Excavators Limited, Rocester, United Kingdom

[21] Appl. No.: 645,531

[22] Filed: Jan. 24, 1991

[30] Foreign Application Priority Data

Jan. 25, 1990 [GB] United Kingdom ............... 9001750
May 1, 1990 [GB] United Kingdom ............... 9009779

[51] Int. Cl.$^5$ ........................... B62D 5/087; B62D 5/09
[52] U.S. Cl. .................................................... 180/140
[58] Field of Search ................. 180/140, 234; 280/91

[56] References Cited

U.S. PATENT DOCUMENTS

| | | | |
|---|---|---|---|
| 3,185,245 | 5/1965 | Hoyt | 280/91 |
| 4,315,555 | 2/1982 | Schritt | 180/140 |
| 4,457,389 | 7/1984 | Voelz | 180/140 |
| 4,638,883 | 1/1987 | Moriizumi et al. | 180/140 X |
| 4,750,628 | 6/1988 | Laurich-Trost | 180/140 X |
| 4,884,647 | 12/1989 | Mimuro et al. | 180/140 |
| 4,917,204 | 4/1990 | Andrew et al. | 180/140 |
| 5,012,881 | 5/1991 | Yokote et al. | 180/140 |

FOREIGN PATENT DOCUMENTS 0131156 1/1985 European Pat. Off. .
334723 9/1989 European Pat. Off. ............ 180/140

Primary Examiner—Charles A. Marmor
Assistant Examiner—Kevin Hurley
Attorney, Agent, or Firm—Spensley Horn Jubas & Lubitz

[57] ABSTRACT

A vehicle has at least two pairs of ground engaging wheels, which vehicle can alternatively be steered with two or four wheels, the vehicle comprising a chassis having first and second pairs of ground engaging wheels which are movable to effect steering of the vehicle, the wheels of each pair being mounted at opposite sides of the chassis and the second pair of wheels being lockable in a position such that simple steering is effected solely by the first pair of wheels, the first pair of wheels being movable to effect steering by a first fluid actuator to which fluid is fed from a steering valve, and the second pair of wheels being movable by a second fluid actuator to which fluid is fed via a steering mode selector valve from the steering valve means, the steering mode selector valve having a first operating condition when fluid from the steering valve is not fed to the second fluid actuator whereby simple steering is effected solely by the first pair of wheels and a second operating condition wherein fluid from the steering valve is fed to the second fluid actuator whereby compound steering is effected by the first and second pairs of wheels the first or second operating condition of the steering mode selector valve being retained until the steering mode selector valve receives a positive control signal to change the operating condition of the steering mode selector valve means so that the steering mode of the vehicle last selected i.e. two or four wheel steering, is remembered by the steering mode selector valve.

26 Claims, 6 Drawing Sheets

FOUR WHEEL STEERING VEHICLE WITH VALVE POSITION RETAINING MEANS

BACKGROUND OF THE INVENTION

This invention relates to a vehicle having at least two pairs of ground engaging wheels, which vehicle can alternatively be steered with two or four wheels.

DESCRIPTION OF THE PRIOR ART

In our previous application No. GB 2208282 there is proposed such a vehicle in which a control valve responds to an electrical signal from a control circuit to achieve two wheel or four wheel steering. However, in the absence of an electrical signal, the valve automatically returns to a rest condition in which two wheel steering is effected.

The control circuit has a memory so that in the event that electrical power is disrupted with the control valve in a four wheel steering position, e.g., when the vehicle is parked, when power is restored, the control circuit again automatically provides an appropriate signal to the control valve which responds to achieve four wheel steering.

It is an object of the present invention to provide a new or improved vehicle.

SUMMARY OF THE INVENTION

According to the invention we provide a vehicle comprising a chassis having first and second pairs of ground engaging wheels which are movable to effect steering of the vehicle, the wheels of each pair being mounted at opposite sides of the chassis and the second pair of wheels being lockable in a position such that simple steering is effected solely by the first pair of wheels, the first pair of wheels being movable to effect steering by a first fluid actuating means to which fluid is fed from a steering valve means, and the second pair of wheels being movable by a second fluid actuating means to which fluid is fed via a steering mode selector valve means from the steering valve means, the steering mode selector valve means having a first operating condition when fluid from the steering valve means is not fed to the second fluid actuating means whereby simple steering is effected solely by the first pair of wheels, and a second operating condition wherein fluid from the steering valve means is fed to the second fluid actuating means whereby compound steering is effected by the first and second pairs of wheels, the first or second operating condition of the steering mode selector valve means being retained until the steering mode selector valve means receives a positive signal from a control means to change the operating condition of the steering mode selector valve means.

Thus the steering mode of the vehicle last selected i.e. two or four wheel steering, is remembered by the steering mode selector valve means.

Preferably the steering mode selector valve means comprises an electrically actuated valve which assumes the first operating condition on receipt of a first positive signal from the control means, and assumes the second operating condition on receipt of a second positive signal from the control means. For example, the steering mode selector valve means may comprise first and second solenoids which move a valve spool of the valve means, the first solenoid being responsive to receive the first signal and the second solenoid being responsive to receive the second signal from the control means. The steering mode selector valve means may comprise mechanical inter-engaging means to retain the valve spool in the first or second operating condition until a signal is received by the second or first solenoid respectively.

The first fluid actuating means may comprise at least one double acting actuator having a piston slidable in a cylinder, the fluid being fed to one side of the or each actuator to move the first pair of wheels in one direction by the steering valve means when in a first position, and fluid being fed to the other side of the or each actuator to move the first pair of wheels in the opposite direction by the steering valve means when in a second position, the steering valve means having a third position when fluid is not fed to the first fluid actuating means.

The second fluid actuating means may also comprise at least one double acting actuator.

Preferably when the steering valve means is in its first position, fluid is expelled from the opposite side of the or each actuator of the first fluid actuating means to which fluid is fed from the steering valve means, the expelled fluid being fed to the steering mode selector valve means which, when the steering mode selector valve means is in its second operating condition only, feeds the expelled fluid to the second fluid actuating means to effect movement of the second pair of wheels whereby compound steering with all four wheels is achieved, and when the steering mode selector valve means is in its first operating condition, the expelled fluid fed thereto from the first fluid actuating means is returned to a reservoir without being fed to the second fluid actuating means whereby two wheel simple steering only is achieved and the second pair of wheels are locked, and when the steering valve means is in its second position, fluid is fed to the steering mode selector valve means which when in its second operating condition only, feeds the fluid to the second fluid actuating means to effect movement of the second pair of wheels, fluid returned from the second fluid actuating means being fed to the first fluid actuating means whereby compound steering with all four wheels is achieved and when the steering mode selector valve means is in its first operating condition, fluid from the steering valve means is not fed to the second fluid actuating means but only to the first fluid actuating means whereby the second pair of wheels are locked and simple steering is effected with the first pair of wheels only.

Where the second fluid actuated means comprises at least one double acting actuator, comprising a piston slidable in a cylinder, fluid may be fed to one side of the or each actuator to effect movement of the second pair of wheels in one direction, when the steering mode selector valve means is in its second operating condition and the steering valve means is in the first position, and fluid being fed to the other side of the or each actuator to move the second pair of wheels in the opposite direction when the steering mode selector valve means is in its second operating condition and the steering valve means is in the second position.

It will be appreciated that if the first pair of wheels is moved in an opposite direction to the second pair of wheels, four wheel compound steering in a so called cramp mode will be achieved, whereas if the first pair of wheels is moved in the same direction to the second pair of wheels, four wheel compound steering in a so called crab mode will be achieved.

Preferably fluid reversing valve means is provided between the steering mode selector valve means and the second fluid actuating means whereby the side of the or each actuator of the second fluid actuating means to which fluid is fed when the steering mode selector valve means is in its second operating condition, depends upon the operating position of the fluid reversing valve means.

For example, when the steering mode selector valve means is in its second operating condition and the steering valve means is in its first or second position, when the fluid reversing valve means is in a first operating position fluid is fed to the or each actuator of the second fluid actuating means to achieve movement of the second pair of wheels in the same direction as the first pair of wheels, and when the steering mode selector valve means is in its second operating condition and the steering valve means is in its first or second position, when the fluid reversing valve means is in a second operating position, fluid is fed to the or each actuator of the second fluid actuated means to achieve movement of the second pair of wheels in an opposite direction to the first pair of wheels.

Preferably the fluid reversing valve means comprises an electrically actuated valve having a valve spool which assumes the first operating position on receipt of a first signal from the control means, and assumes the second operating position on receipt of a second signal from the control means.

For example, the fluid reversing valve means may comprise first and second solenoids which move the valve spool of the valve means, the first solenoid being responsive to receive a first positive signal and the second solenoid being responsive to receive a second positive signal from the control means to change the operating position of the fluid reversing valve means. The fluid reversing valve means may comprise mechanical inter-engaging means to retain the valve spool in the first or second operating position until a signal is received by the second or first solenoid respectively.

The control means may comprise an electrical control circuit which includes a selector means operable to enable an operator to effect simple two wheel steering when the steering mode selector valve means will assume its first operating condition, or compound four wheel steering when the steering mode selector valve means will assume its second operating condition.

Preferably the vehicle has sensor means associated with each of the two pairs of wheels to provide a signal to the control means when the wheels of the respective pair of wheels are in a straight ahead position, the control means being arranged so that a signal is only sent to the steering mode selector valve means to change the steering mode from simple to compound steering and vice versa when the selector means is operated to change the steering mode and the control means receives a signal from at least the sensor means associated with the second pair of wheels.

The control means may include a first dual position latching switch means which when moved to a first latched position, operates the steering mode selector valve means to assume its first operating condition in which simple two wheel steering is achieved and when moved to a second latched position operates the steering mode selector valve means to assume its second operating condition in which compound four wheel steering is achieved. Preferably the first dual position latching switch means is only movable between its first and second latched positions when the selector means is operated to change the steering mode and the control means receives a signal from at least the sensor means associated with the second pair of wheels.

The control means may include a second dual position latching switch means which when moved to a first latched position operates the fluid reversing valve means where provided to achieve steering movement of the second pair of wheels in the same direction as the first pair of wheels, and when moved to a second latched position operates the fluid reversing valve means to achieve steering movement of the second pair of wheels in an opposite direction to the first pair of wheels.

Preferably the second dual position latching switch means is only movable between its first and second latched positions when the selector means is operated to change the steering mode and the control means receives a signal from at least the sensor means associated with the first pair of wheels.

The or each of the first and second dual position latching switch means may comprise a bi-stable relay.

If desired, an indicator means may be provided to indicate to an operator whether simple two wheel steering or compound four wheel steering, and where appropriate, whether the second pair of wheels are movable in the same or opposite directions to the first pair of wheels, is in operation.

The respective sensor means may each comprise a proximity switch associated with steering gear of the vehicle which effects movement of or moves with the respective pair of wheels, the proximity switch sensing the proximity of a relatively movable element without contacting the relatively movable element.

BRIEF DESCRIPTION OF THE DRAWINGS

The invention will now be described with reference to the accompanying drawings in which.

DESCRIPTION OF THE INVENTION

Figure 1:
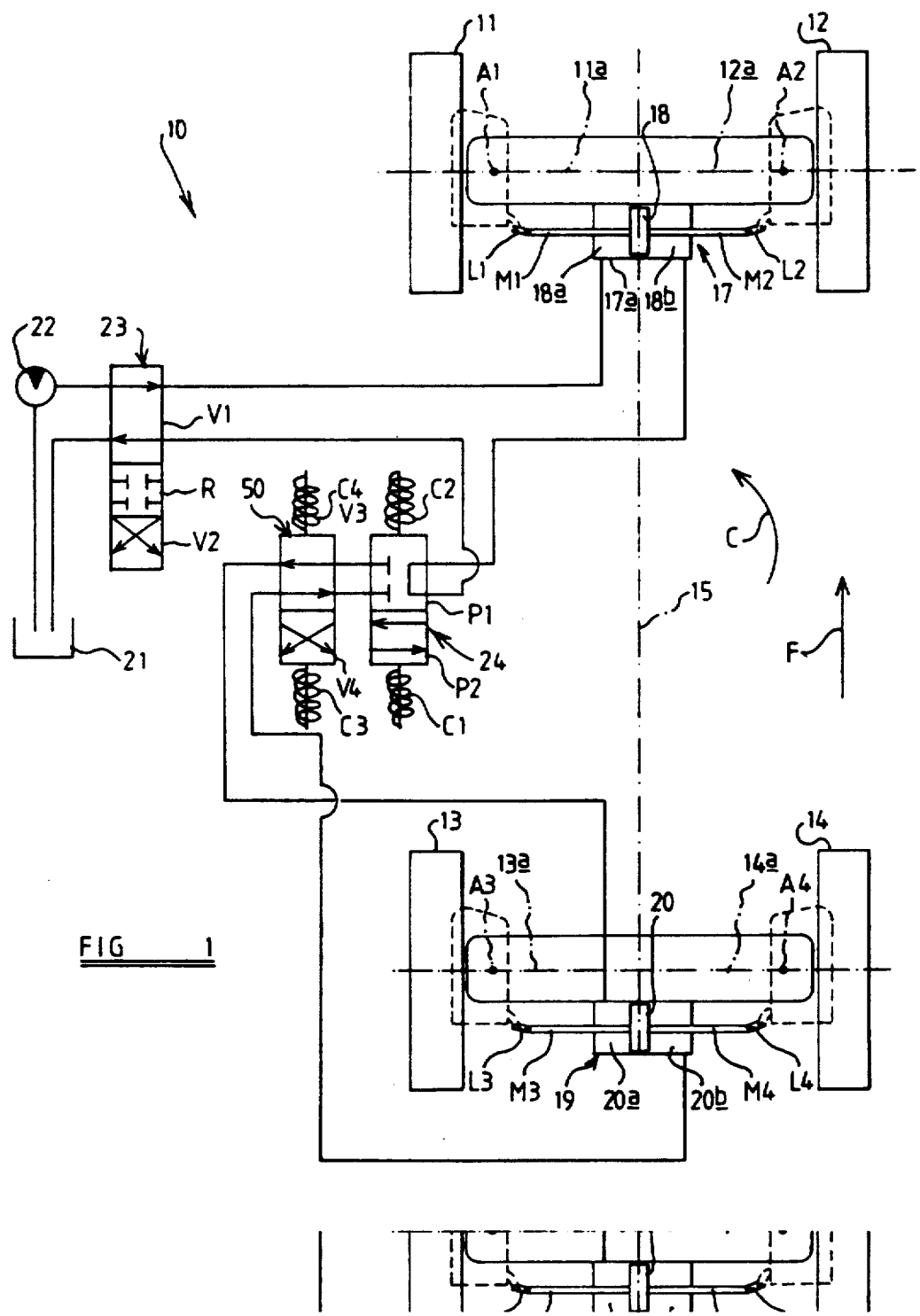
FIG. 1 is a diagrammatic view of a vehicle in accordance with the invention showing a hydraulic circuit by which steering of the vehicle is effected, hydraulic valves being shown in the positions they would occupy for simple two wheel steering of the vehicle using only a first of two pairs of wheels.

Referring first to FIG. 1 of the drawings, a vehicle 10 comprises four wheels 11,12,13, and 14 mounted in pairs at either side of a longitudinal axis 15 of an elongate chassis of the vehicle 10.

A first pair of wheels 11,12, are front wheels and are mounted on an axle for rotation about respective rotational axes 11a and 12a as the vehicle moves, and the wheels are movable together by a respective double acting hydraulic actuator 17, about steering axes A1,A2, so that the wheels 11,12 may be used for steering the vehicle.

A second pair of wheels 13,14 are rear wheels and are similarly mounted on an axle for rotation about respective rotational axes 13a and 14a, the wheels 13,14 also being movable together about respective steering axes A3,A4, by a respective double acting hydraulic actuator 19, so that the wheels 13,14, may also be used for steering the vehicle 10.

Hydraulic fluid is supplied from a reservoir 21 by a hydraulic pump 22, via a steering valve means comprising a hydraulic control valve 23, to the actuator 17, or actuators 17, and 19, depending on the operating condition of a steering mode selector valve means 24.

The actuator 17 comprises a piston 18 mounted for sliding movement in a cylinder 17a, the piston 18 having secured to each side thereof, a respective actuating member M1,M2, comprising a piston rod which is connected to the respective wheel 11,12, by a link L1 or L2, as hereinafter described.

Similarly, actuator 19 comprises a piston 20 mounted for sliding movement in a cylinder 19a, the piston 20 having secured to each side thereof a respective actuating member M3,M4, again comprising a piston rod which is connected by a link L3 or L4 to a respective wheel 13,14.

The steering valve 23 is shown simplified and diagrammatically, and can be operated in any one of three positions to a greater or lesser extent by an operator e.g. using a steering wheel or another steering control. As shown in FIG. 1, the valve 23 has been moved from a rest position R to a first position V1 in which fluid is fed under pressure through valve 23 to the one side 18a of piston 18 so that wheels 11 and 12 will each turn anticlockwise about their steering axes A1,A2 whereby the vehicle, when moving forwards, generally in the direction of arrow F, shown in FIG. 1, will be steered to the left in the general direction indicated by arrow C.

Fluid expelled from the other side 18b of actuator 17 is fed via steering mode selector valve means 24 back through the steering valve 23 to the reservoir 21.

As shown in FIG. 1, the first operating condition of steering mode selector valve means 24 is a two wheel or simple steer operating condition. The valve means 24 is solenoid operated by a control means as hereinafter described. In the first operating condition P1 shown in FIG. 1, the expelled fluid from side 18b of the actuator 17 simply passes through the valve means 24, whilst the actuator 19, associated with the rear wheels 13,14, is locked out i.e. hydraulic fluid cannot pass to or from either side of the piston 20 of the actuator 19.

Thus the wheel 13,14, take no part in steering the vehicle which is effected solely by the front wheels 11,12.

It will be appreciated that in FIG. 1, although the steering valve 23 is moved to condition V1 to cause the front wheels 11,12, to turn about their axes A1,A2 anticlockwise, the wheels 11,12, are shown in straight ahead positions in which their axes of rotation 11a, 12a are aligned and generally perpendicular to axis 15 i.e. the wheels are shown just prior to the wheels 11,12, beginning to move.

At the will of the operator, the steering valve 23 could be moved to the rest position R in which case the acutator 17 is also locked out, or to a second position V2 in which the direction of fluid flow is completely reversed, i.e. fluid is fed (after passing through valve 24) to the side 18b of actuator 17, to effect movement of the wheels 11,12, clockwise about their steering axes A1,A2, to steer the vehicle 10 to the right as it moves forwardly, but the rear wheels 13,14, will, whilst valve 24 is in the condition shown in FIG. 1, remain stationary.

Figure 2:
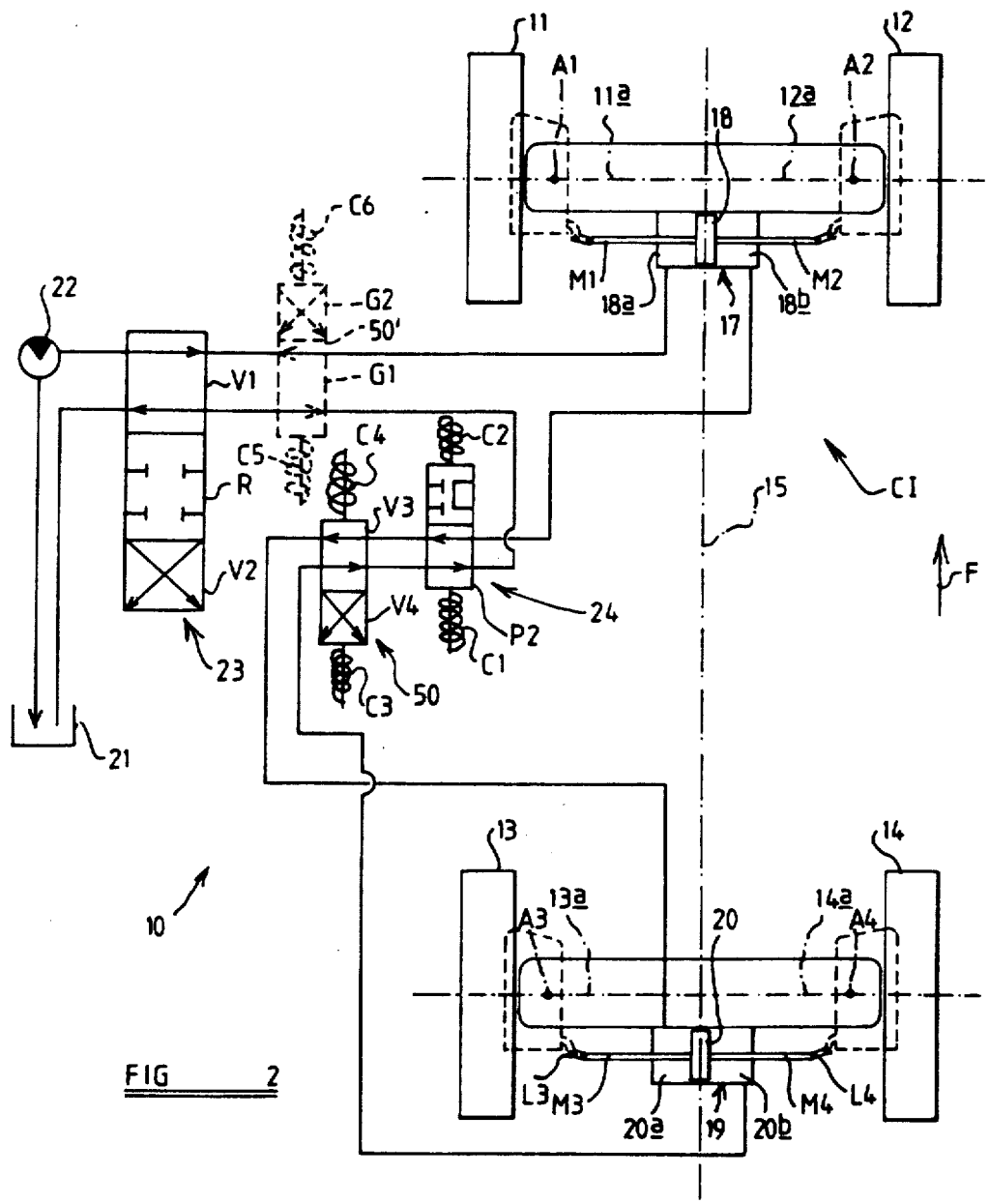
FIG. 2 is a view similar to FIG. 1 but the valves are shown in the positions they would occupy for compound four wheel steering.

Referring now to FIG. 2, each of the components are labelled with the same reference numerals as the components of FIG. 1.

Valve 23 has again been moved to a first position V1 in which fluid passes through the valve 23 under pressure to side 18a of actuator 17, to effect movement of the front wheels 11,12, anticlockwise about their steering axes A1,A2.

However, the expelled fluid from the side 18b of the acutator 17, does not simply pass back through the valve means 24 to valve 23 and to the reservoir 21, but valve means 24 has been moved to a second operating or four wheel or compound steer condition P2 such that the expelled fluid from actuator 17 passes through valve means 24 through a fluid reversing valve means 50 which is in a first condition V3 to one side 20a of actuator 19 to cause movement of the wheels 13,14, anticlockwise about their steering axes A3 and A4.

Thus the rear wheels 13,14, are released from their locked out positions and are unable to effect compound steering of the vehicle. As the vehicle 10 moves forwardly generally in the direction of arrow F, the vehicle performs a crabbing motion i.e. moves generally diagonally for example in a direction indicated by arrow C1 because the wheels 11,12, are moved in the same directions as wheels 13,14.

Thus the piston 20 of actuator 19 is moved by the fluid expelled from the actuator 17.

If the direction of fluid through the steering valve 23 is reversed by the operator, by moving the valve 23 to its second position V2, fluid will be fed to side 20b of actuator 19 to cause the rear wheels 13,14, to move about their steering axes A3,A4 generally clockwise, and fluid expelled from the side 20a of actuator 19, would be fed back through valve 24 to side 18b of actuator 17 so that the front wheels 11,12, will be moved by the fluid for rotation about their steering axes A1 and A2 generally clockwise and thus the vehicle will move or crab generally diagonally to the right.

Again steering valve 23 may be moved by the operator to the rear position R in which the wheels 11,12,13,14, will all be locked in the positions to which they are previously moved.

Referring now to FIG. 3, again similar components to the vehicle of FIGS. 1 and 2 are again labelled by the same reference numerals.

Figure 3:
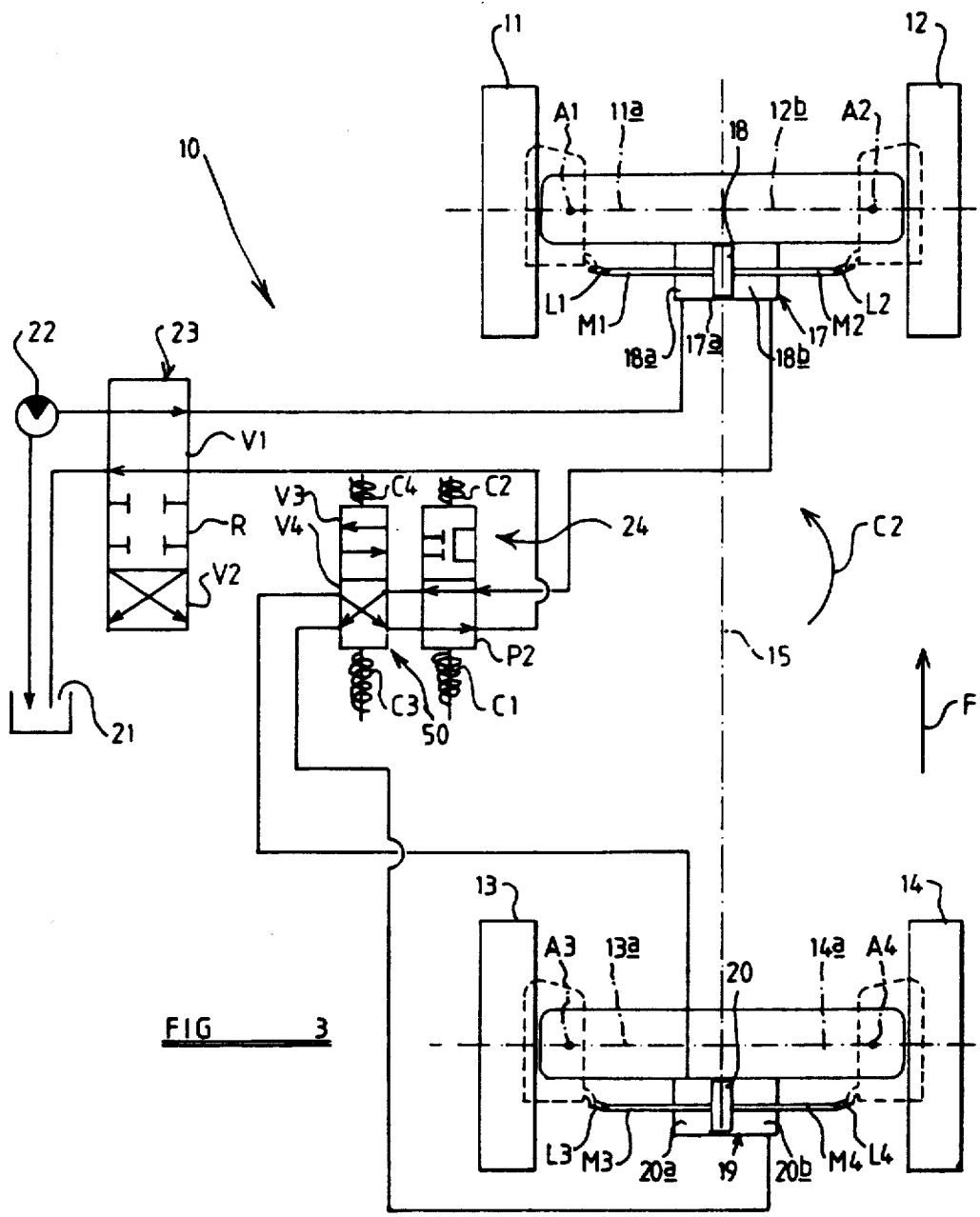
FIG. 3 is a view similar to FIG. 1 but with the valves shown in the positions they would occupy for an alternative compound four wheel steering mode.

In FIG. 3, the valve means 24 has again been moved to its second operating condition P2, so that fluid passes through the valve means 24 to the actuator 19.

However, the fluid reversing valve means 50 has been moved to an alternative compound steering position V4. Again, with the steering valve 23 in its first position V1, fluid is fed through valve 23 to side 18a of actuator 17 to cause the front wheels 11,12, to move anticlockwise about their steering axes A1,A2.

Fluid expelled from side 18b of actuator 17 passes through valve means 24 and the fluid reversing valve means 50 to side 20b of actuator 10 so that the wheels 13,14, move clockwise about their steering axes A3,A4.

Thus again, the rear wheels 13,14, take an active part in steering the vehicle 10 but always move about their axes A3,A4 in opposition to the direction of movement of the front wheels 13,14, about the axes A1,A2, so that the vehicle performs a "cramping" motion i.e. a very tight turn as the vehicle is moved in the general direction of arrow F, as indicated by the arrow C2.

By reversing the flow of fluid through steering valve 23, the operator can cause the front wheels 11,12, to be moved clockwise by the fluid expelled from the actuator 19 of the rear wheels 13,14, which will move anticlockwise, and also steering valve 23 can be moved to its rest position R so that each of the wheels 11 to 14 are locked in the positions to which they were previously moved.

Figure 4:
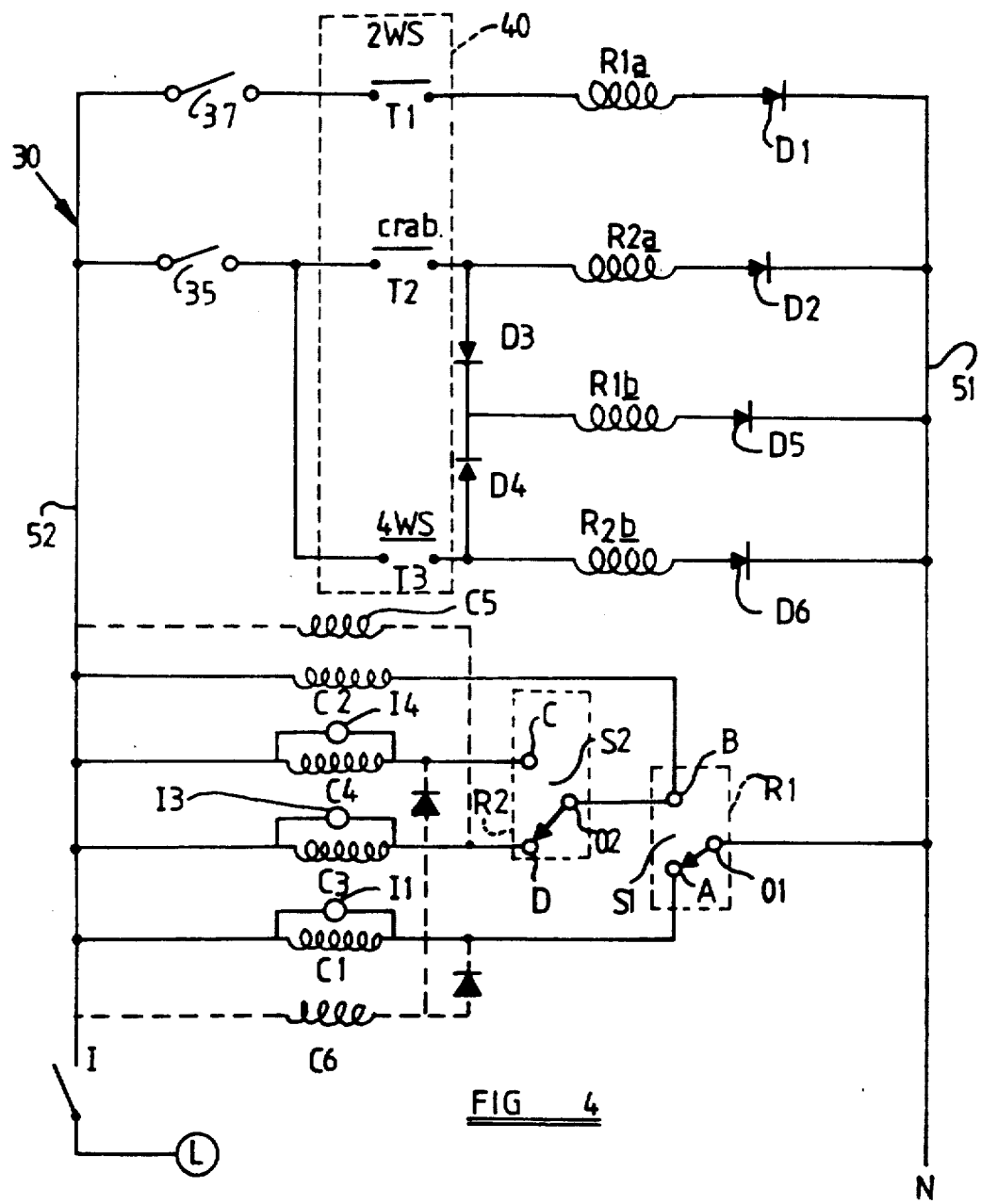
FIG. 4 is a diagrammatic view of a control circuit of a control means for use with the vehicle of FIG. 1, and, FIG. 5 is a diagrammatic illustration showing the positions of proximity switches on steering gear of the vehicle.

As mentioned above, the valve 23 is movable by the operator, whereas valve means 24 is solenoid operated by a control means including the circuit which is shown generally at 30 in FIG. 4.

It will be appreciated that when the vehicle is being compound steered using four wheels it is desirable for the front and rear wheels always to be in phase whereby the degree of turn effected by the front wheels 11,12, is always in proportion to the degree of turn effected by the rear wheels 13,14.

Further, in a simple steering operation, it is desirable for the rear wheels 13 and 14 to be in the straight ahead position shown in FIGS. 1 to 3 in which their axes of rotation 13a,14a, are aligned with each other and are generally perpendicular to the axis 15.

Figure 5:
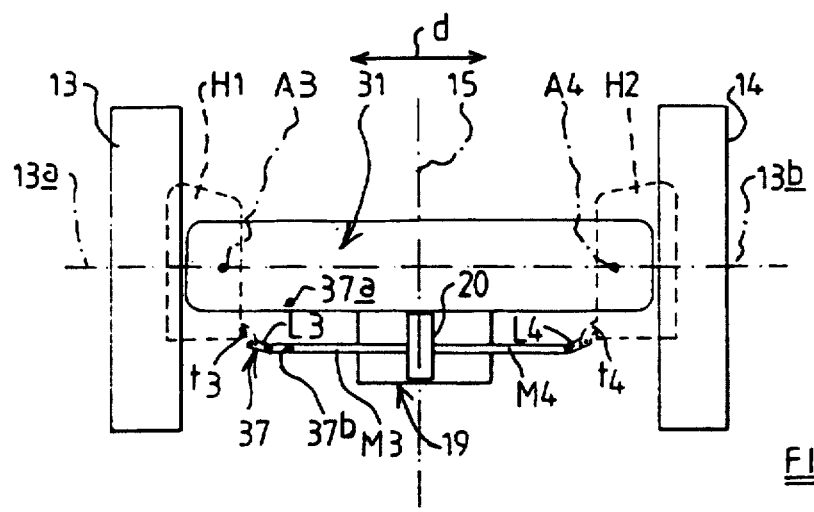

To enable an operator to achieve alignment of the rear wheels 13,14, when changing from compound to simple steering and/or of the front and rear wheels when changing from simple to compound steering, a sensor means is provided associated with each of the pairs of front and rear wheels. In FIG. 5, the rear wheels 13,14, are shown, hubs H1,H2, of which are pivotally mounted at A3,A4, on an axle 31 which is secured relative to a chassis of the vehicle. Conventionally a track rod would extend between tags 13,14, of the hubs H1,H2, and be movable in the directions shown by the arrow d by actuators to steer the vehicle 10.

In the present case, the track rod is replaced by the actuator 19, the rods M3,M4 of which, are pivotally connected to the links L3,L4, which in turn are pivotally connected to the tags 13,14, of the respective hubs H1,H2 of wheels 13,14.

Thus as the wheels 13,14, move during steering, the links L3,L4, accommodate the changing distance between the tags 13,14, and the rods M3,M4.

The cylinder 19 is secured relative to the axle 31 or another part immovable relative to the chassis of the vehicle.

The sensor means comprises a proximity switch 37 comprising a first part 37a which is mounted on the axle 31 and a second part 37b which is carried by one of the actuating rods M3,M4. The switch 37 may for example, be of the inductive type which senses when parts 37a, 37b, are at their closes position i.e. in the present instance when the wheels 13 and 14 are in their straight ahead positions whereby the axes of rotation 13a, 13b of the wheels 13,14, are aligned with each other and generally perpendicular to the elongate axis 15 of the vehicle.

Other types of sensor means may be used but preferably the sensor 37 senses the proximity of the relatively movable part 37b, carried by the member M3 relative to the part 37a without the parts 37a, 37b needing to contact each other.

A substantially similar arrangement is provided on the front wheels, for mounting a second proximity switch 35.

Referring now also to FIG. 4, a control circuit 30 is shown which incorporates the sensor means 35,37, and a means to control valve means 24 and 50.

At the heart of the circuit is a manually operable selector switch 40 which the operator can control to select simple two wheel steering or compound four wheel steering by crabbing or cramping.

Two dual position latching relays R1,R2 are provided, which each has two coils which are shown at R1a, R1b, and R2a, R2b. The contacts of the relays are shown at S1 and S2 respectively.

The coil R1a is in series with a first switch T1 which is in series with the proximity switch 37 of the rear wheels.

The coil R2a is in series with a second switch T2 of the selector means 40 which is in series with the rear proximity switch 35. The coils R1a. R2a are both connected via respective diodes D1 and D2 to a bus 51 which is connected to neutral N.

The proximity switches 35 and 37 are each connected to a second bus 52 which is connected via an ignition switch I to terminal L.

The contacts S1 of the relay R1 are arranged so that a common terminal 01 is connected to either a terminal A or a terminal B depending on which of the coils R1a and R1b of the relay R1 was last actuated.

The contacts S2 of relay R2 permit a common terminal 02 which is connected to terminal B of the relay R1, to be connected either to a terminal C or to a terminal D depending on which of the coils R2a and R2b of the relay R2 was last energised.

The coil R1b is connected both to a contact between switch T2 of the selector means 40 and the coil R2a via a diode D3 and to a contact between a switch T3 of the selector means 40 and the coil R2b of relay R2 via a further diode D4, and the opposite end of the coil R1b is connected via a diode D5 to the bus 51.

The coil R2b Of relay R2 is connected in series with the third switch T3 of the selector means 40 to the bus 51, and the switch T3 is otherwise connected to a contact between the front proximity switch 35 and the switch T2. A diode D6 is placed between the relay coil R2b and the bus 51.

Terminal A of contacts S1 of relay R1 is connected via a coil C1 of the steering mode selector valve means 24 to the positive bus 52. Terminal B of relay R1 is connected via a coil C2 of the steering mode selector valve means 14 to the bus 52.

Terminal D of relay R2 is connected via a coil C3 of the fluid reversing valve means 50 to the bus 52, and terminal C of the relay R2 is connected via a coil C4 of the fluid reversing valve means 50 to the bus 52.

Each of the coils C1,C3 and C4, have in parallel with them, an indicator light I1, I3, and I4 respectively.

Operation of the control circuit 30 will not be described.

When switch T1 of the selector means 40 is closed, when the rear wheels 11,12, of the vehicle are in a straight ahead position, such that proximity switch 37 is closed, i.e. the parts 37a and 37b are in their closest positions, the coil R1a of the relay R1 is energised and accordingly, the contacts 01 and A of the relay R1 are connected, as shown in FIG. 4, and coil C1 of the steering mode selector valve means 14 will be energised. Thus the steering mode selector valve means 24 will assume the position shown in FIG. 1, i.e. simple two wheel steer only is selected. Thus the operator can operate steering valve 23 to steer the vehicle 10 using the front wheels 11,12, as desired. It will be appreciated that because the relay R1 is a latching relay, the contacts 01 and A will remain connected such that coil C1 will remain energised, at least until an alternative steering mode is selected by the operator.

In any case, the steering mode selector valve means 24 is preferably of the type which, when one of the coils C1,C2 is actuated, remains in the condition to which the valve means 14 is moved until the other coil C2,C1 is energised to move the valve means 24 to an opposite condition. For example, the coils C1 and C2 may act upon a valve spool within the valve means 24 which moves to a first position (as seen in FIG. 1) when coil C1 is energised, and is moved to a second positive condition (FIGS. 2 and 3) when coil C2 is energised, mechanical inter-engaging means of the valve means 24 maintaining the valve spool in the respective position until the other coil is energised.

Such a valve is shown in and described with reference to FIG. 6 below.

Similarly, reversing valve 50 is preferably also of a similar type i.e. having mechanical inter-engaging means which maintain the valve spool in position V3 and V4 until the other respective coil C4,C3, is energised.

If an operator wishes to select four wheel compound steering e.g. where the wheels 11,12,13 and 14 all move in the same direction i.e. crabbing, the operator closes switch T2. Preferably the selector means 40 is of the type such that when any one of the switches T1 and T3 is closed, the other two switches automatically assume an open condition. Thus there will no longer be current in coil R1a.

When switch T2 is closed, and the front wheels are moved to their straight ahead positions such that proximity switch 35 is closed, i.e. the two parts of the switch 35 are in their closest positions, the coil R1b of the relay R1 will be energised and accordingly, the contacts 01 and B of relay R1 will become closed and contacts 01 and A will be opened.

Also, coil R2a will be energised and thus the contacts 02 and D of relay R2 will become closed (if not already closed), whilst the contacts 02 and C will be open. Thus coil C1 will no longer be energised, although coils C2 and C3 will be energised. In this case, the steering mode selector valve means 24 will be moved to its second operating position as shown in FIG. 2, when hydraulic fluid can pass through the valve means 24 to the fluid reversing valve means 50. By virtue of coil C3 becoming energised, the valve 50 will be moved to the position indicated in FIG. 2 (if the valve 50 is not already in this position).

Thus the operator by closing switch T2 can change the steering mode to cause the wheels 11 to 14 to steer the vehicle with the wheels 13 and 14 moving in the same direction as wheels 11,12, but only once the front wheels 11,12, are in their straight ahead positions.

In the event that the operator wishes to select four wheel steer in which the wheels 11 and 12 move in an opposite direction to wheels 13 and 14 so that the vehicle will perform a cramping motion, the operator closes switch T3 and hence switches T1 and T2 will be open. As soon as the front wheels 13,14, pass through their straight ahead position, proximity switch 35 will be closed and immediately the coils R1b and R2b will become energised. Coil R1b when energised will cause the terminals 01 and B of the relay R1 to be connected (if they are not already so) and coil R2b when energised will cause the contacts 02 and C of relay R2 to be closed and contacts 02 and D to be open. In this event, the coils C2 and C4 will be energised to move the steering mode selector valve 24 to the position shown in FIG. 3 (if it is not already in this position) and the fluid reversing valve means 50 to the position shown in FIG. 3 so that the operator can, by closing switch T3 change the steering mode to cause the front wheels 11 and 12 to be moved oppositely from the wheels 13 and 14 as previously described.

It can be seen that when coil C1 is energised, the indicator light I1 becomes illuminated to indicated to an operator that he is in two wheel simple steering mode. When coil C3 is energised, indicator light I3 is lit to indicate to a driver that he has selected compound steering mode with the two pairs of wheels moving in the same direction, and when coil C4 is energised, indicator light 14 is lit to indicate to a driver that he is in compound steering mode with the wheels 11 and 12 moving oppositely to the wheels 13 and 14.

Thus the indicator lights I1,I3, and I4, tally with the actual steering mode rather than the selected steering mode.

It will be appreciated that change of steering mode from two wheel steer to four wheel steer, or four wheel steer to two wheel steer, or four wheel steer in which all the wheels move in the same direction and four wheel steer in which the front pair of wheels 11,12, move in opposite directions to the wheels 13, 14, can only be effected when the or the respective proximity switch or switches 35, 37 is/are closed, notwithstanding that prior to this an operator can select on the selector means 40 any one of the switches T1.T2 and T3. Immediately when the front wheels 11, 12, are in their straight ahead positions when changing from two wheel to four wheel steering, or between crab and cramp mode four wheel steering, or the rear wheels when changing from four wheel steering to two wheel steering, are in their straight ahead positions, changing of steering mode can be effected.

Upon a change of steering mode being selected from four wheels to two wheel steer, switch T1 is closed, thus opening switches T2, T3. When the rear pair of the wheels 13, 14, are in their straight ahead position, proximity switch 37 will close. Thus their movement will be arrested when they are in their stright ahead position as value means 14 moves to its R1 position.

As described, steering mode selector valve means 24 and the fluid reversing valve means 50 are preferably of the type which have mechanically inter-engaging formations to retain respective valve spools of the valve means in the positions to which the valve spools where last moved when the coils C1, C2, C3, or C4 were last energised.

Hence in the event that electrical power to the coils C1, C2, C3 or C4 is disconnected, for example if the vehicle is parked and ignition switch 1 is switched off, the valve spools of the valve means 24 and 50 will remain in the positions in which they were last set. Hence immediately power is restored i.e. the ignition switch I is connected, the vehicle 10 is ready to be driven away and steered in the steering mode last selected by the operator.

It will be appreciated by those skilled in the art, that the valves 23, 24 and 50 shown in FIGS. 1 to 3 are very simplified illustrations of practical values which are readily commercially available, which would be required to enable an operator to achieve accurate steering of his vehicle.

In practice, a proportional valve, such as a Danfoss steering valve would be required for valve 23 such as their OSPB valve, version, ON, OR, and CN, but the exact nature of the valve 23 used is not crucial to the working of the present invention, and hence the valve shown at 23 is only a diagrammatic illustration of one simple type of valve to facilitate understanding of the invention.

In FIG. 4, instead of using mechanical bi-stable relays R1, R2, any other dual position, preferably latching, switches, such as a suitable electronic device or devices could be used.

Although in the preferred embodiment described, the front wheels 11, 12, are steered when the vehicle is in a two wheel steer mode, in another arrangement, the rear wheels could be steered for two wheel steering.

In this event, the vehicle 10 could (normally) travel in a direction opposite to that shown by arrow F in FIGS. 1 to 3 so that wheels 11, 12, can be the rear wheels, and wheels 13, 14, the front wheels.

Certain modifications would be necessary to the hydraulic and electrical control circuits as indicated in dotted lines in FIGS. 2 and 4.

When the vehicle is steered in crab mode, it would be necessary to reverse the flow of fluid to each of the actuators 17, 19, which can simply be achieved by using an auxiliary fluid receiving valve means 50' having two operating positions i.e. position 1 which is used for two wheel steering and cramp mode steering, and position G2 used for crab mode steering. The valve 50' may be similar in construction to valve 50, and may be moved to position G1 when coil C6 is energised, and to position G2 when coil C5 is energised.

In FIG. 4 it will be seen that coil C6 is energised whenever coils C1 or C4 are energised, and coil C5 is energised whenever coil C3 is energised.

Instead of the first part 37a of the proximity switch 37, or the corresponding first part of the proximity switch 35 being mounted on the respective axle, if desired the first part of the proximity switch may be mounted on any other component which is fixed relative to the chassis of the vehicle and relative to which the other part 37b of the proximity switch 37, 35, in use, moves.

If desired, instead of providing separate valves 24, 50, these may be incorporated into a single position valve as described in our previous patent GB 2208282, but preferably the valve would be modified to provide mechanical detent means for example to retain the operating condition of the vehicle selected until a signal is received from the control circuit to change the operating condition of the valve.

Figure 6:
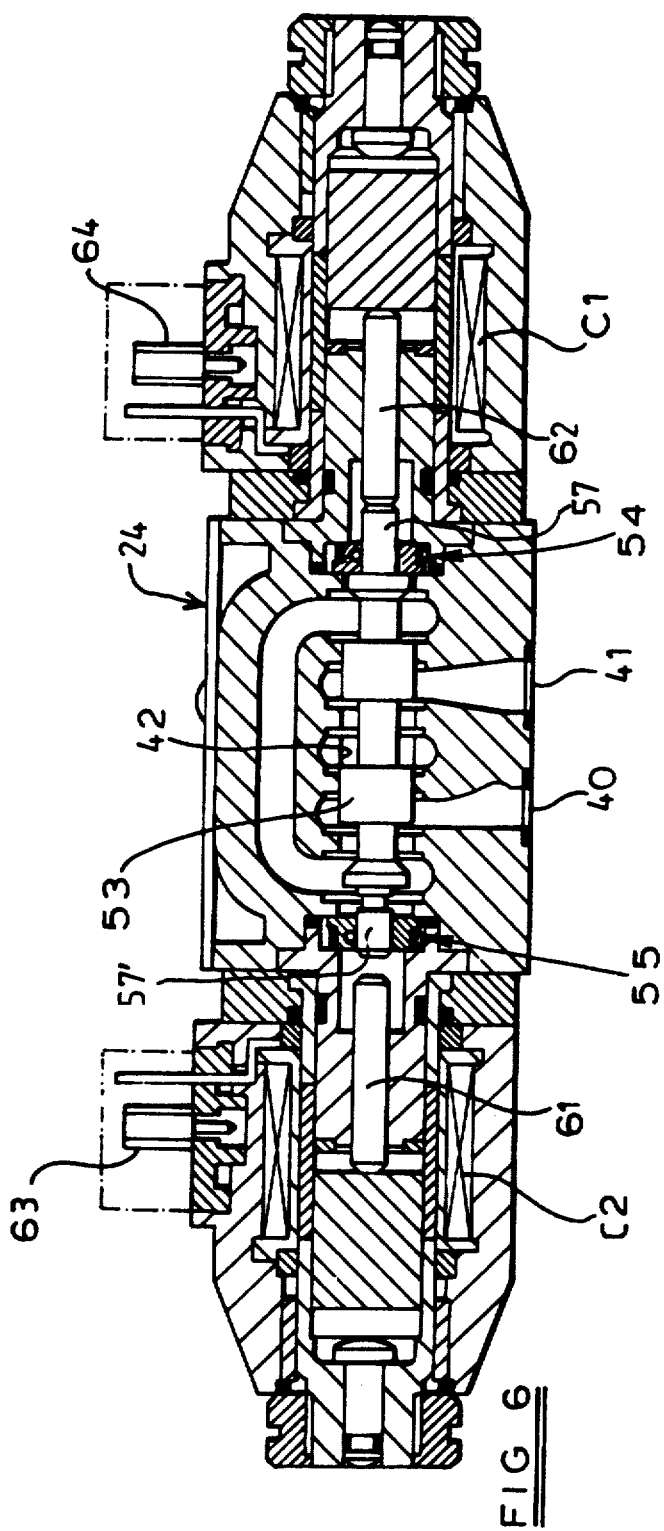
FIG. 6 is an illustrative side sectional view of a valve means of a vehicle in accordance with the invention.
Figure 7:
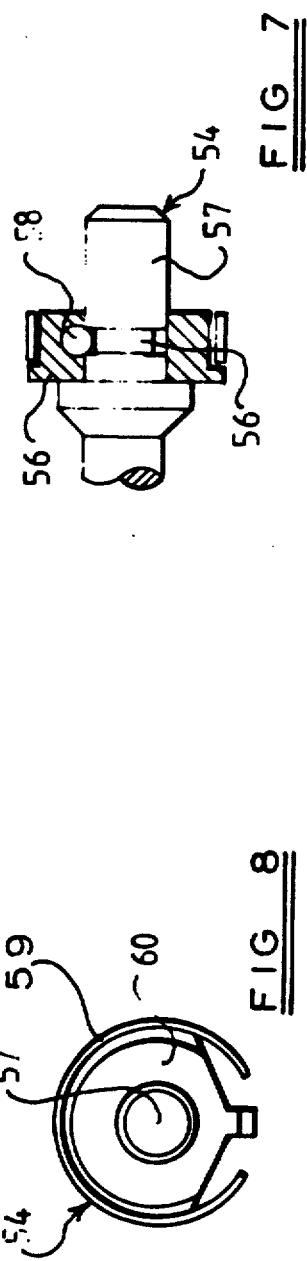
FIG. 7 is an enlarged side view of part of the valve of FIG. 6.
Figure 8:
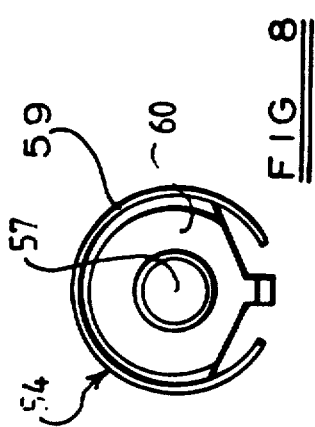
FIG. 8 is an enlarged end view of the part of the valve shown in FIG. 7.

Referring to FIGS. 6 to 8, there is shown illustratively a practical version of a valve 24 for use in the vehicle of FIGS. 1 to 5. It will be appreciated that a substantially similar valve to valve 24 having substantially identical mechanical detent means as the valve 24 of FIGS. 6 to 8, may be provided for valve 50 (and valve 50' where provided) but with alternative fluid flow paths within the valves to enable the valves to operate as described above.

The valve 24 comprises first and second ports 40, 41, which are each connected to a central passageway 42 in which a spool 53 is slidably received.

In the conditions shown in the drawings, i.e. position P2, the spool 53 has been moved to the far right where it is retained by mechanical detent means 54 which are best seen to an enlarged scale, in FIGS. 7 and 8. Substantially identical, but oppositely handed detent means 55 are shown for retaining the spool 53 in a left hand condition corresponding to position P1.

The mechanical detent means 54 comprises a circumferential groove 56 provided in a guide part 57 of the spool 53, and a spring biased ball 58 which is resiliently urged by a detent spring 59 axially inwardly of the guide part 57. The spring 59 surrounds a housing 60 which is held fast in the central passageway 42 of the valve 24. As the spool 53 and hence the guide part 57 are moved to the right to the position shown in FIG. 6, the ball 58 is urged into engagement with the groove 56 to retain the spool in the right hand position.

If sufficient force is exerted on the spool 53 to move the spool to the left, against the force provided by the detent spring 59, the ball 58 will be urged from its groove 56 thus freeing the spool 53 to move to the left. When the spool 53 reaches a far left position, the mechanical detent means 55 will act to retain the spool 53 in its far left position until a sufficient force is exerted to overcome the force exerted by the detent spring of detent means 55.

Movement of the spool 53 to the right is achieved by energising coil C2, whilst movement to the left is achieved by energising coil C1 when respective armatures 61, 62, associated with the respective coils C1 and C2 will be moved to contact the respective guide part 57 (or 57' at the left end of spool 53), hence to move the spool 53.

It will be appreciated that the coils C1, C2 each need to exert sufficient force to overcome the retaining force between the respective balls 58 and their grooves 56 provided by the detent springs 59 and that once the spool 53 has been moved sufficiently to the left or the right once the respective detent means 54, 55, are engaged, the spool 53 will be retained in that position even when power to the respective coils C1, C2 is cut off, until the other respective coil C2, C1 is energised.

When the valve 24 is in the condition P2 shown, the port 40 is connected via galleries within the valve 24 to a further port 63 and the port 41 is connected via further galleries within the valve to a further port 64.

Thus, referring to FIG. 2, when fluid is supplied to port 40, the fluid may pass through the valve 24 to port 63 and hence to the actuating means 19 of the wheels 13, 14, and fluid returned from the actuating means 19 can pass through the valve from port 64 to port 41 and hence be returned to tank.

In the event that the steering valve means 23 is actuated in position V2 rather than position V1, fluid flow through valve 24 will be reversed such that fluid will be fed to port 41 and pass through the valve to port 64, and fluid will be returned to tank after being fed to port 63 and passing through the valve to port 40.

When solenoid C1 is actuated, the armature 61 will move to the left to cause the detent means 55 to retain the spool 53 in the left hand position corresponding to position P1 as shown in FIG. 1.

In this event, fluid flow through the valve 24 between the respective ports 40 and 63, and 41 and 64 will be cut off such that fluid fed to port 40 will simply pass to port 41, and vice versa, so that the valve 24 will operate as shown and described with reference to FIG. 1.

It will be appreciated that the valve 24 described with reference to FIGS. 6 to 8 is only an example of a valve having mechanical detent means which permit the valve to operate so as to retain the operating condition of the valve until a positive signal is received from the control means to change the operating condition of the valve.

We claim:

1. A vehicle comprising a chassis, means mounting first and second pairs of ground engaging wheels on the chassis, the first and second pairs of wheels being movable to effect steering of the vehicle, the wheels of each pair being mounted at opposite sides of the chassis and the second pair of wheels being lockable in a position such that simple steering is effected solely by the first pair of wheels, the first pair of wheels being movable to effect steering by a first fluid actuating means to which fluid is fed from a steering valve means, and the second pair of wheels being movable by a second fluid actuating means to which fluid is fed via a steering mode selector valve means from the steering valve means, the steering mode selector valve means having a first operating condition when fluid from the steering valve means is not fed to the second fluid actuating means whereby simple steering is effected solely by the first pair of wheels, and a second operating condition wherein fluid from the steering valve means is fed to the second fluid actuating means whereby compound steering is effected by the first and second pairs of wheels, the first or second operating condition of the steering mode selector valve means being retained until the steering mode selector valve means receives a positive signal from a control means to change the operating condition of the steering mode selector valve means.

2. A vehicle according to claim 1 wherein the steering mode selector valve means comprises an electrically actuated valve which assumes the first operating condition on receipt of a first positive signal from the control means, and assumes the second operating condition on receipt of a second positive signal from the control means.

3. A vehicle according to claim 2 wherein the steering mode selector valve means comprises first and second solenoids which move a valve spool of the valve means, the first solenoid being responsive to receive the first signal and the second solenoid being responsive to receive the second signal from the control means.

4. A vehicle according to claim 3 wherein the steering mode selector valve means comprises mechanical inter-engaging means to retain the valve spool in the first or second operating condition until a signal is received by the second or first solenoid respectively.

5. A vehicle according to claim 1 wherein the first fluid actuating means comprises at least one double acting actuator having a piston slidable in a cylinder, the fluid being fed to one side of the actuator to move the first pair of wheels in one direction by the steering valve means when in a first position, fluid being fed to the other side of the actuator to move the first pair of wheels in the opposite direction by the steering valve means when in a second position, the steering valve means having a third position when fluid is not fed to the first fluid actuating means.

6. A vehicle according to claim 5 wherein the second fluid actuating means also comprises at least one double acting actuator.

7. A vehicle according to claim 5 wherein when the steering valve means is in its first position, fluid is expelled from the opposite side of the actuator of the first fluid actuating means to which fluid is fed from the steering valve means, the expelled fluid being fed to the steering mode selector valve means which, when the steering mode selector valve means is in its second operating condition only, feeds the expelled fluid to the second fluid actuating means to effect movement of the second pair of wheels whereby compound steering with all four wheels is achieved, and when the steering mode selector valve means is in its first operating conditions, the expelled fluid fed thereto from the first fluid actuating means is returned to a reservoir without being fed to the second fluid actuating means whereby two wheels simply steering only is achieved and the second pair of wheels are locked, and when the steering valve means is in its second position, fluid is fed to the steering mode selector valve means which when in its second operating condition only, feeds the fluid to the second fluid actuating means to effect movement of the second pair of wheels, fluid returned from the second fluid actuating means being fed to the first fluid actuating means whereby compound steering with all four wheels is achieved and when the steering mode selector valve means is in its first operating condition, fluid from the steering valve means is not fed to the second fluid actuating means but only to the first fluid actuating means whereby the second pair of wheels are locked and simple steering is effected with the first pair of wheels only.

8. A vehicle according to claim 6 wherein fluid is fed to one side of the actuator to effect movement of the second pair of wheels in one direction, when the steering mode selector valve means is in its second operating condition and the steering valve means is in the first position, and fluid being fed to the other side of the actuator to move the second pair of wheels in the opposite direction when the steering mode selector valve means is in its second operating condition and the steering valve means is in the second position.

9. A vehicle according to claim 6 wherein a fluid reversing valve means is provided between the steering mode selector valve means and the second fluid actuating means whereby the side of the actuator of the second fluid actuating means to which fluid is fed when the steering mode selector valve means is in its second operating condition, depends upon the operating position of the fluid reversing valve means.

10. A vehicle according to claim 8 wherein when the steering mode selector valve means is in its second operating condition and the steering valve means is in one of its first and second positions, when the fluid reversing value means is in a first operating position fluid is fed to the actuator of the second fluid actuating means to achieve movement of the second pair of wheels in the same direction as the first pair of wheels, and when the steering mode selector valve means is in its second operating condition and the steering valve means is in the other of its first and second positions, when the fluid reversing valve means is in a second operating position, fluid is fed to the actuator of the second fluid actuated means to achieve movement of the second pair of wheels in an opposite direction to the first pair of wheels.

11. A vehicle according to claim 10 wherein the fluid reversing valve means comprises an electrically actuated valve having a valve spool which assumes the first operating position on receipt of a first signal from the control means, and assumes the second operating position on receipt of a second signal from the control means.

12. A vehicle according to claim 11 wherein the fluid reversing valve means comprises first and second solenoids which move the valve spool of the valve means, the first solenoid being responsive to receive a first positive signal and the second solenoid being responsive to receive a second positive signal from the control means to change the operating position of the fluid reversing valve means.

13. A vehicle according to claim 11 wherein the fluid reversing valve means comprises mechanical interengaging means to retain the valve spool in the first or second operating position until a signal is received by the second or first solenoid respectively.

14. A vehicle according to claim 1 wherein the control means comprises an electrical control circuit which includes a selector means operable to enable an operator to effect simple two wheel steering when the steering mode selector valve means will assume its first operating condition, or compound four wheel steering when the steering mode selector valve means will assume its second operating condition.

15. A vehicle according to claim 14 wherein the vehicle has sensor means associated with each of the two pairs of wheels to provide a signal to the control means when the wheels of the respective pair of wheels are in a straight ahead position, the control means being arranged so that a signal is only sent to the steering mode selector valve means to change the steering mode from simple to compound steering and vice versa when the selector means is operated to change the steering mode and the control means receives a signal from at least the sensor means associated with the second pair of wheels.

16. A vehicle according to claim 15 wherein the control means includes a first dual position latching switch means which moved to a first latched position, operates the steering mode selector valve means to assume its first operating condition in which simple two wheel steering is achieved and when moved to a second latched position operates the steering mode selector valve means to assume its second operating condition in which compound four wheel steering is achieved.

17. A vehicle according to claim 16 wherein the first dual position latching switch means is only movable between its first and second latched positions when the selector means is operated to change the steering mode and the control means receives a signal from at least the sensor means associated with the second pair of wheels.

18. A vehicle according to claim 15 wherein the fluid reversing valve means comprises an electrically actuated valve having a valve spool which assumes the first operating position on receipt of a first signal from the control means, and assumes the second operating position on receipt of a second signal from the control means, and the control means includes a second dual position latching switch means which when moved to a first latched position operates the fluid reversing valve means to achieve steering movement of the second pair of wheels in the same direction as the first pair of wheels, and when moved to a second latched position operates the fluid reversing valve means to achieve steering movement of the second pair of wheels in an opposite direction to the first pair of wheels.

19. A vehicle according to claim 18 wherein the second dual position latching switch means is only movable between its first and second latched positions when the selector means is operated to change the steering mode and the control means receives a signal from at least the sensor means associated with the first pair of wheels.

20. A vehicle according to claim 16 wherein the or each of the first and second dual position latching switch means comprises a bi-stable relay.

21. A vehicle according to claim 1 wherein an indicator is provided to indicate to an operator whether simple two wheel steering or compound four wheel steering, and where appropriate, whether the second pair of wheels are movable in the same or opposite directions to the first pair of wheels, is in operation.

22. A vehicle according to claim 15 wherein the respective sensor means each comprises a proximity switch associated with steering gear of the vehicle which effects movement of or moves with the respective pair of wheels, the proximity switch sensing the proximity of a relatively movable element without contacting the relatively movable element.

23. A vehicle according to claim 9 wherein the fluid reversing valve means comprises an electrically actuated valve having a valve spool which assumes the first operating position on receipt of a first signal from the control means, and assumes the second operating position on receipt of a second signal from the control means.

24. A vehicle according to claim 23 wherein the fluid reversing valve means comprises first and second solenoids which move the valve spool of the valve means, the first solenoid being responsive to receive a first positive signal and the second solenoid being responsive to receive a second positive signal from the control means to change the operating position of the fluid reversing valve means.

25. A vehicle according to claim 23 wherein the fluid reversing valve means comprises mechanical interengaging means to retain the valve spool in the first or second operating position until a signal is received by the second or first solenoid respectively.

26. A vehicle according to claim 1 wherein said steering mode selector valve means comprise retaining means for enabling a change in the operating condition of said steering mode selector valve means only upon receipt of a positive signal from a control means.

* * * * *